(12) United States Patent
Daniel

(10) Patent No.: US 6,389,732 B1
(45) Date of Patent: May 21, 2002

(54) RADIO-CONTROLLED FISHING APPARATUS AND METHOD

(76) Inventor: Michael L. Daniel, 4607 Edinborough Rd., Greensboro, NC (US) 27406

(*) Notice: Subject to any disclaimer, the term of this patent is extended or adjusted under 35 U.S.C. 154(b) by 0 days.

(21) Appl. No.: 09/604,819

(22) Filed: Jun. 28, 2000

(51) Int. Cl.[7] .................. A01K 89/012; A01K 91/06; A01K 97/00
(52) U.S. Cl. .......................................... 43/4.5; 43/26.1
(58) Field of Search .................... 43/4.5, 26.1

(56) References Cited

U.S. PATENT DOCUMENTS

| | | | |
|---|---|---|---|
| 3,710,500 A | * 1/1973 | Pena | 43/17.5 |
| 3,739,516 A | * 6/1973 | Holling | 43/26.1 |
| 4,161,077 A | 7/1979 | Ciaccio et al. | 43/26.1 |
| 4,253,165 A | 2/1981 | Christiansen | 367/96 |
| 4,339,888 A | * 7/1982 | Sheng-Jung | 43/26.1 |
| 4,635,391 A | * 1/1987 | Early | 43/26.1 |
| 4,638,585 A | 1/1987 | Korte | 43/26 |
| 4,757,633 A | 7/1988 | Van Cleve | 43/26 |
| 4,856,222 A | * 8/1989 | Hannam | 43/26.1 |
| 5,077,929 A | 1/1992 | Khan | 43/26.1 |
| 5,086,581 A | 2/1992 | Barra | 43/26.1 |
| 5,154,016 A | 10/1992 | Fedora | 43/26.1 |
| 5,165,193 A | 11/1992 | Dankwardt | 43/26.1 |
| 5,293,712 A | 3/1994 | Lo | 43/26.1 |
| 5,309,664 A | 5/1994 | Wright | 43/26.1 |
| 5,361,530 A | 11/1994 | Kashani et al. | 43/26.1 |
| 5,363,587 A | 11/1994 | Nordling | 43/26.1 |
| 5,581,932 A | 12/1996 | Bell | 43/26.1 |
| 5,806,232 A | 9/1998 | James | 43/26.1 |
| 6,041,537 A | * 3/2000 | Sullivan | 43/26.1 |
| 6,263,611 B1 | * 7/2001 | Kimura | 43/26.1 |

OTHER PUBLICATIONS

"Bait Shuttle—the best kept fishin secret," Internet Advertising Printout dated Oct. 27, 1999.

* cited by examiner

*Primary Examiner*—Kurt Rowan

(57) ABSTRACT

Radio-controlled fishing apparatus is provided including a hand-held radio signal generator which is integrally formed with a telescoping fishing rod. A fishing line extends from the rod to a miniature boat which includes a radio signal receiver and an electric motor which drives a propeller. The method of use includes guiding the boat to a suitable fishing location or along a trolling route by the radio signal generator whereupon a fish striking the attached bait can be manually reeled in, along with the boat. A slip attachment connected to the fishing line allows the line to quickly release from the boat thereby freeing the line as the fish is played, but allowing the boat to be simultaneously returned to the operator with the fish.

15 Claims, 7 Drawing Sheets

RADIO-CONTROLLED FISHING APPARATUS AND METHOD

FIELD OF THE INVENTION

The invention herein pertains to fishing apparatus utilizing a radio-controlled boat to deliver the fishing hook or line to a desired location on a lake or the like. Once the fish is hooked or otherwise as needed, the boat and line can be manually reeled in.

DESCRIPTION OF THE PRIOR ART AND OBJECTIVES OF THE INVENTION

Fishing devices utilizing radio signal generators and remote controllers have been in existence for many years as evidenced by U.S. Pat. Nos. 5,165,193; 5,361,530 and 4,161,077 and others. Certain of these prior art devices accurately direct a fishing lure to a selected location. However, some require radio controls and battery power to return the boat. Other prior devices do not allow the line to release when the fish is hooked, thereby depriving the fisherman of the proper "feel" as the fish is being played. Certain other prior art devices utilize miniature boats which are easily flipped over or capsized during use, especially with an active game fish on the line.

Thus, with the problems and disadvantages associated with prior art remote radio-controlled fishing devices, the present invention was conceived and one of its objectives is to provide radio-controlled fishing apparatus having a miniature boat which is relatively easy to use by fishermen having few technical skills.

It is another objective of the present invention to provide radio-controlled fishing apparatus and a method which will help insure the catch of active game fish.

It is yet another objective of the present invention to provide a radio signal generator which is integrally formed with a fishing rod and which can frequently be operated easily using only one hand.

It is still another objective of the present invention to provide a radio-controlled fishing apparatus which includes a slip attachment for freeing the line from the boat during use.

It is a further objective of the present invention to provide a radio-controlled fishing apparatus which provides the "feel" to the operator of conventional fishing apparatus as the fish is being reeled in.

Various other objectives and advantages of the present invention will become apparent to those skilled in the art as a more detailed description is set forth below.

SUMMARY OF THE INVENTION

The aforesaid and other objectives are realized by providing radio-controlled fishing apparatus including a signal generator which is integrally formed with a telescoping fishing rod. A manually operated reel is affixed to the rod and line therefrom is joined to a small, miniature boat which includes a radio signal receiver and an electric motor which powers a propeller. A resilient slip attachment is connected to the line for easy engagement and disengagement from the boat. The slip attachment is also connected to a leader which is weaker than the fishing line to allow the leader to break, should the hook or lure affixed thereto become unexpectedly lodged on an obstacle in the water. As the fish strikes the bait, the slip attachment disengages from the boat and provides the operator with the feel of a conventional fishing line.

DETAILED DESCRIPTION OF THE PREFERRED EMBODIMENTS AND OPERATION OF THE INVENTION

Figure 1:
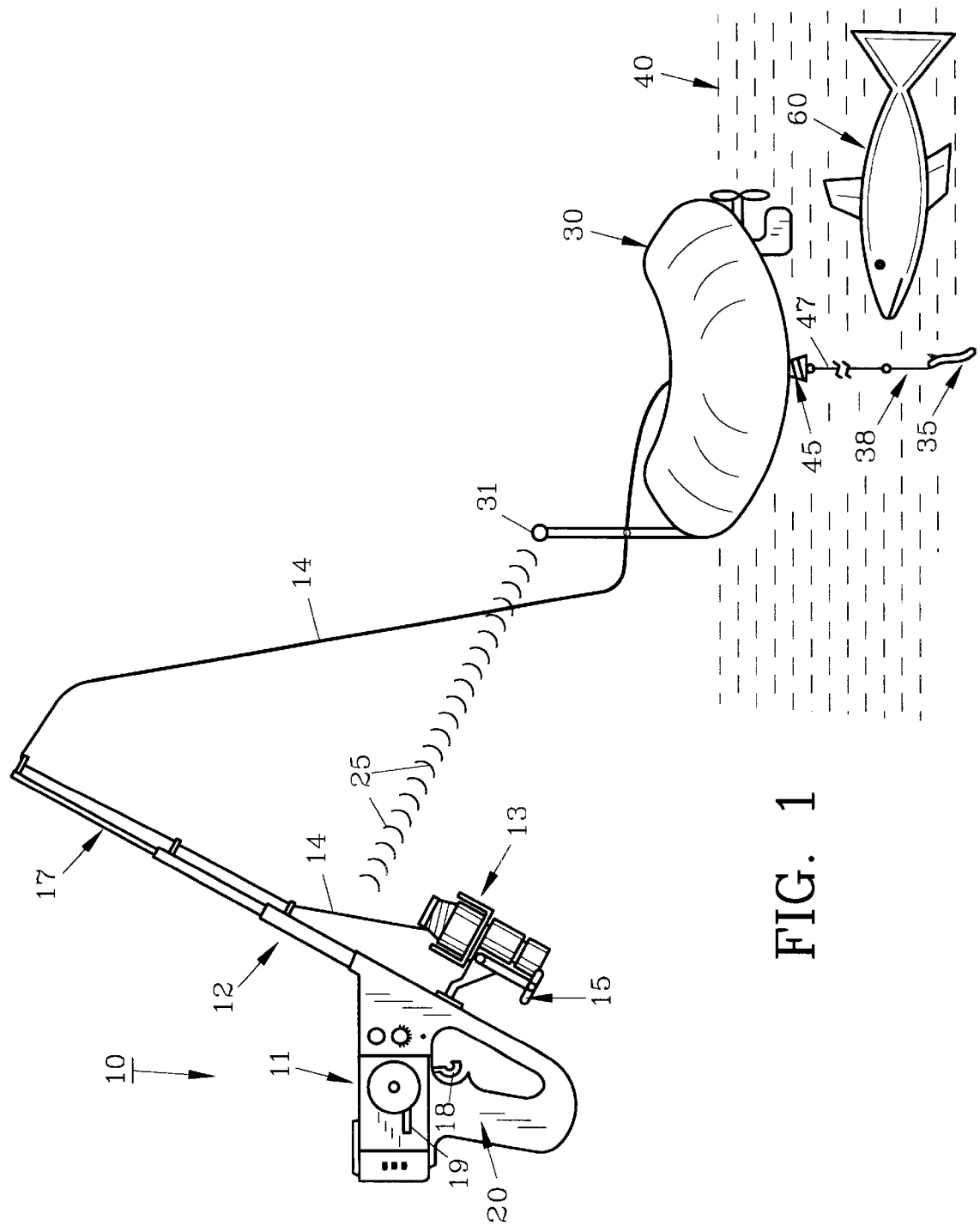
FIG. 1 illustrates the radio-controlled fishing apparatus of the invention.

For a better understanding of the invention and its operation, turning now to the drawings, FIG. 1 illustrates preferred radio-controlled fishing apparatus 10 which includes conventional radio signal generator 11 which is integrally formed with fishing rod 12 having reel 13 affixed thereto. Fishing rod 12 includes shaft 17 which telescopes for ease in storage and transportation. Conventional fishing line 14 as seen may be braided or of the monofilament type and is wound on reel 13 which includes handle 15 for manual use. Line 14 passes through antenna 31 of boat 30 and is joined to slip attachment 45. Leader 47 with hook 38 is connected to slip attachment 45.

Figure 2:
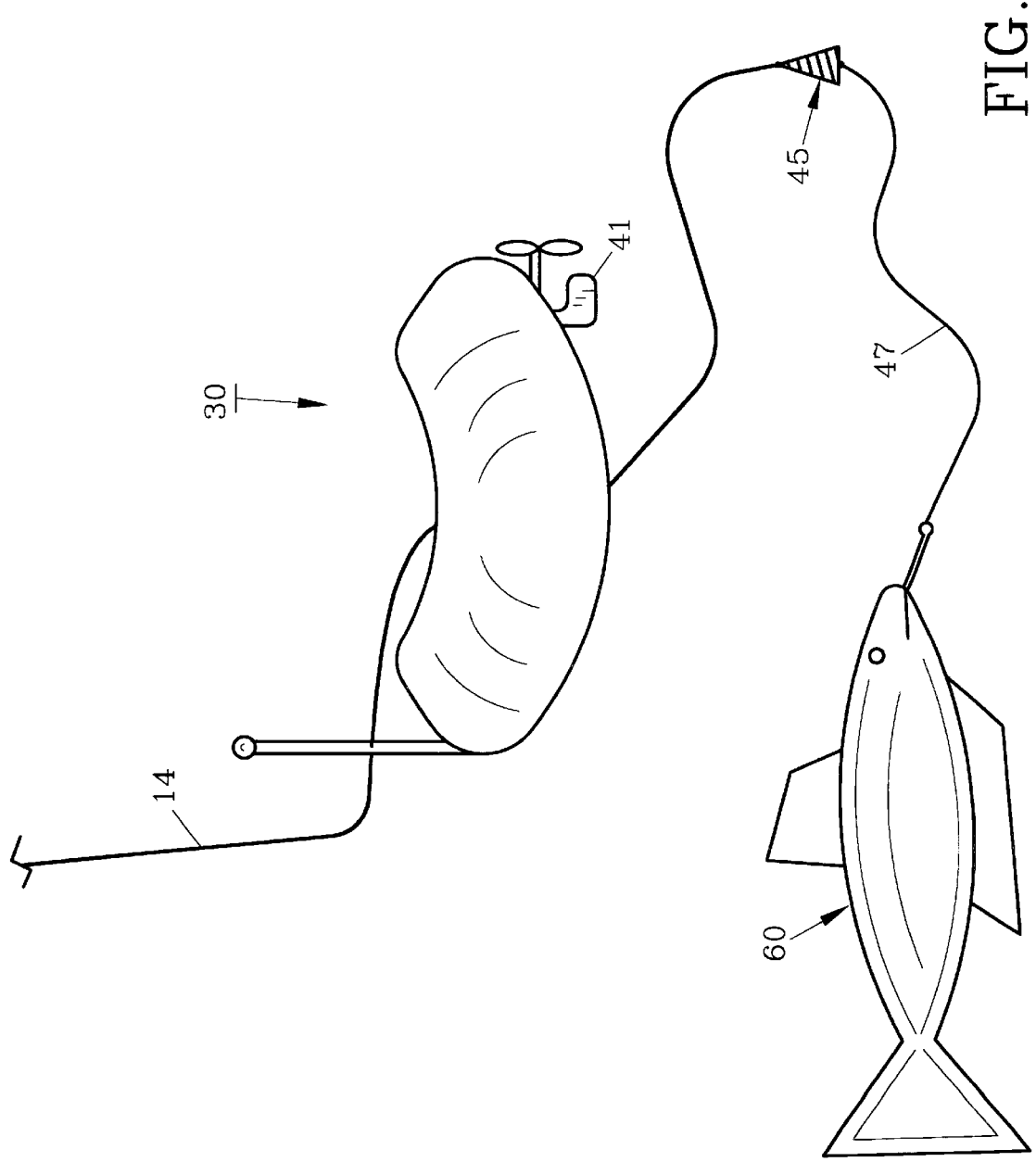
FIG. 2 shows the boat as seen in FIG. 1 with a hooked fish.
Figure 3:
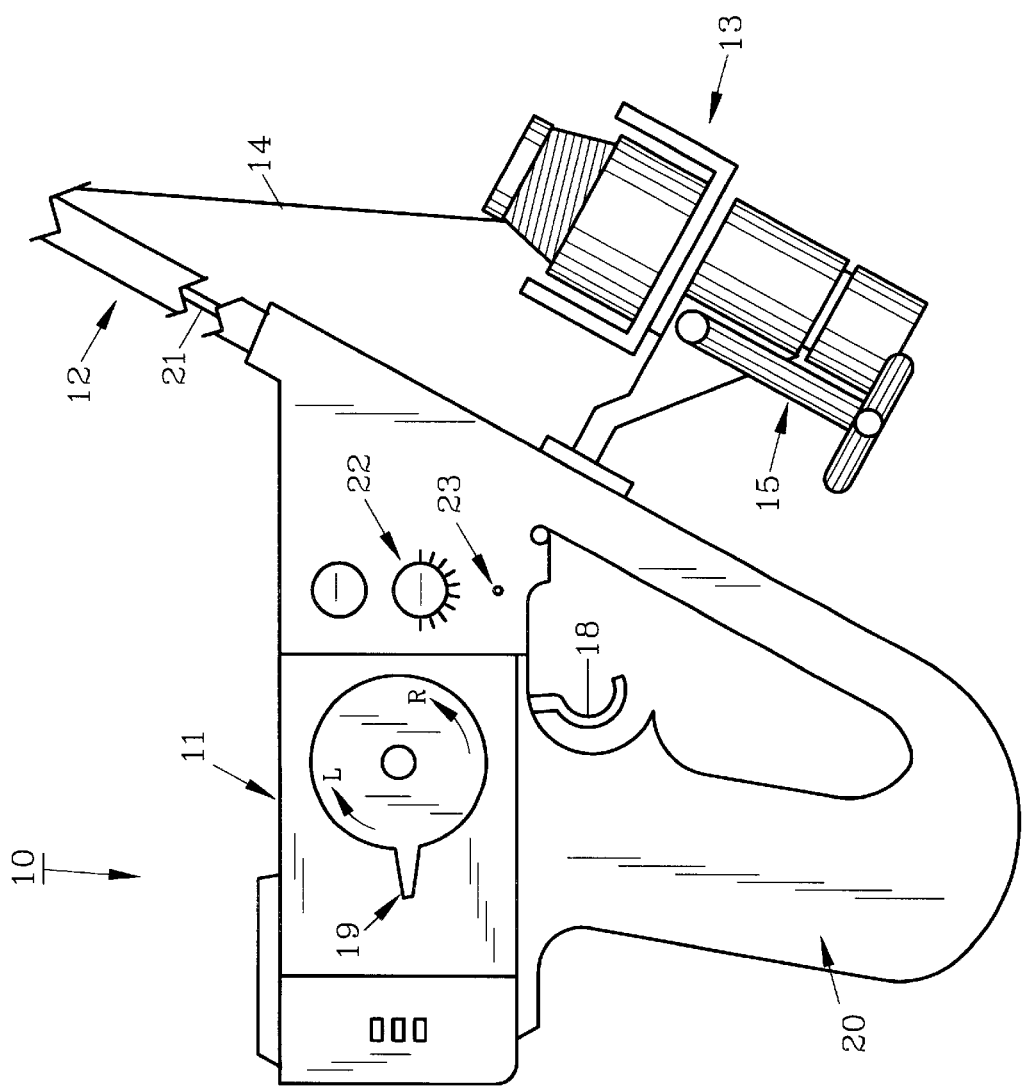
FIG. 3 illustrates an enlarged view of a portion of the radio-controlled fishing apparatus.

Signal generator 11 also has a speed control trigger switch 18 and a directional control switch 19 which can be operated by the thumb of the hand grasping handle 20 shown in more detail in FIG. 3. Direction control switch 19 controls the movement of rudder 41 shown in FIGS. 2 and 4. A standard weed guard (not shown) formed of wire mesh or otherwise may be affixed proximate rudder 41 if desired. Rod 12 conceals antenna 21 which is joined to signal generator 11. Power switch 22 turns battery operated signal generator 11 on and off as determined by LED indicator 23.

Figure 5:
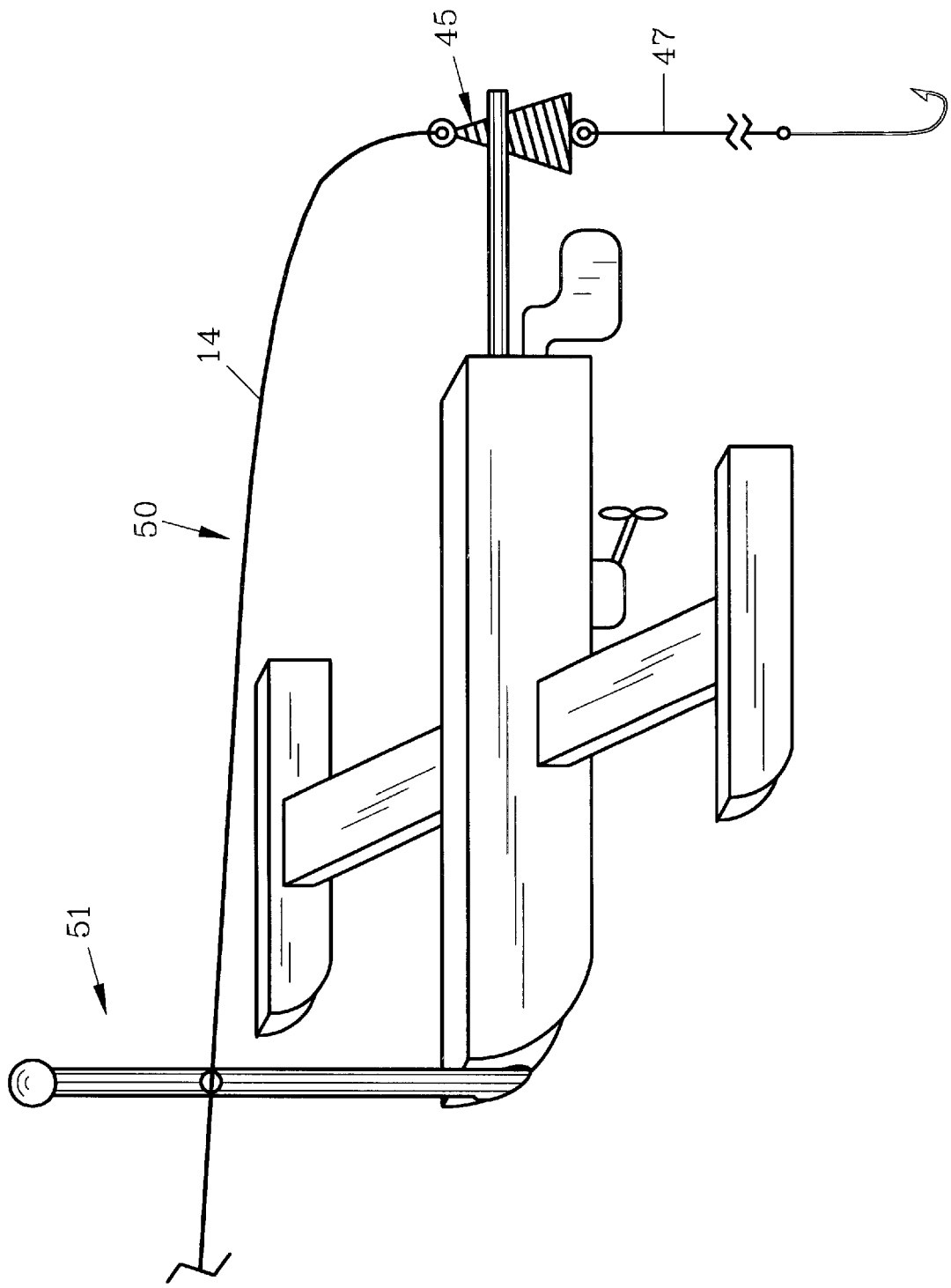
FIG. 5 demonstrates yet another style boat which can be used as part of the fishing apparatus.
Figure 6:
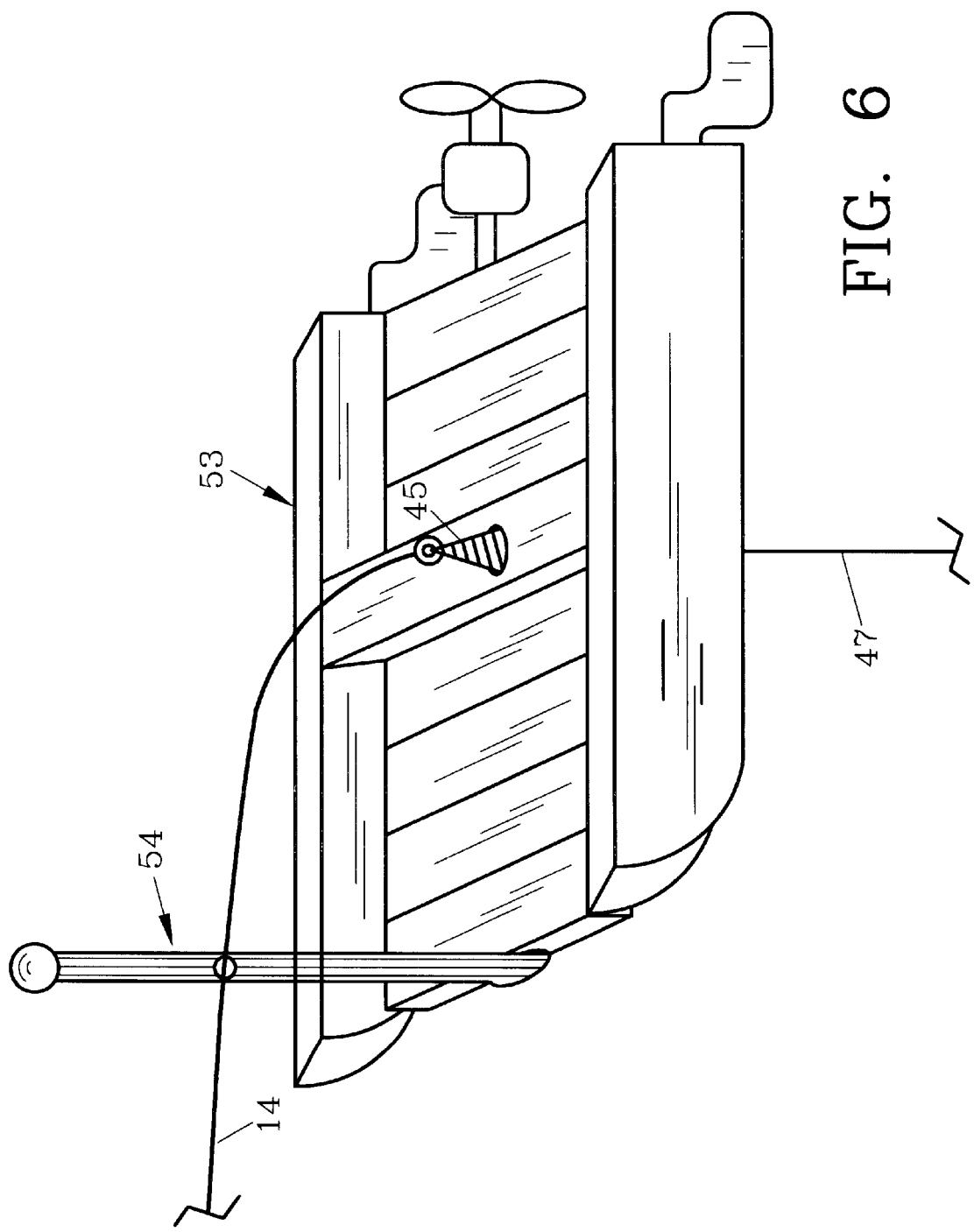
FIG. 6 shows yet another embodiment of a boat style as used with the fishing apparatus of the invention.
Figure 7:
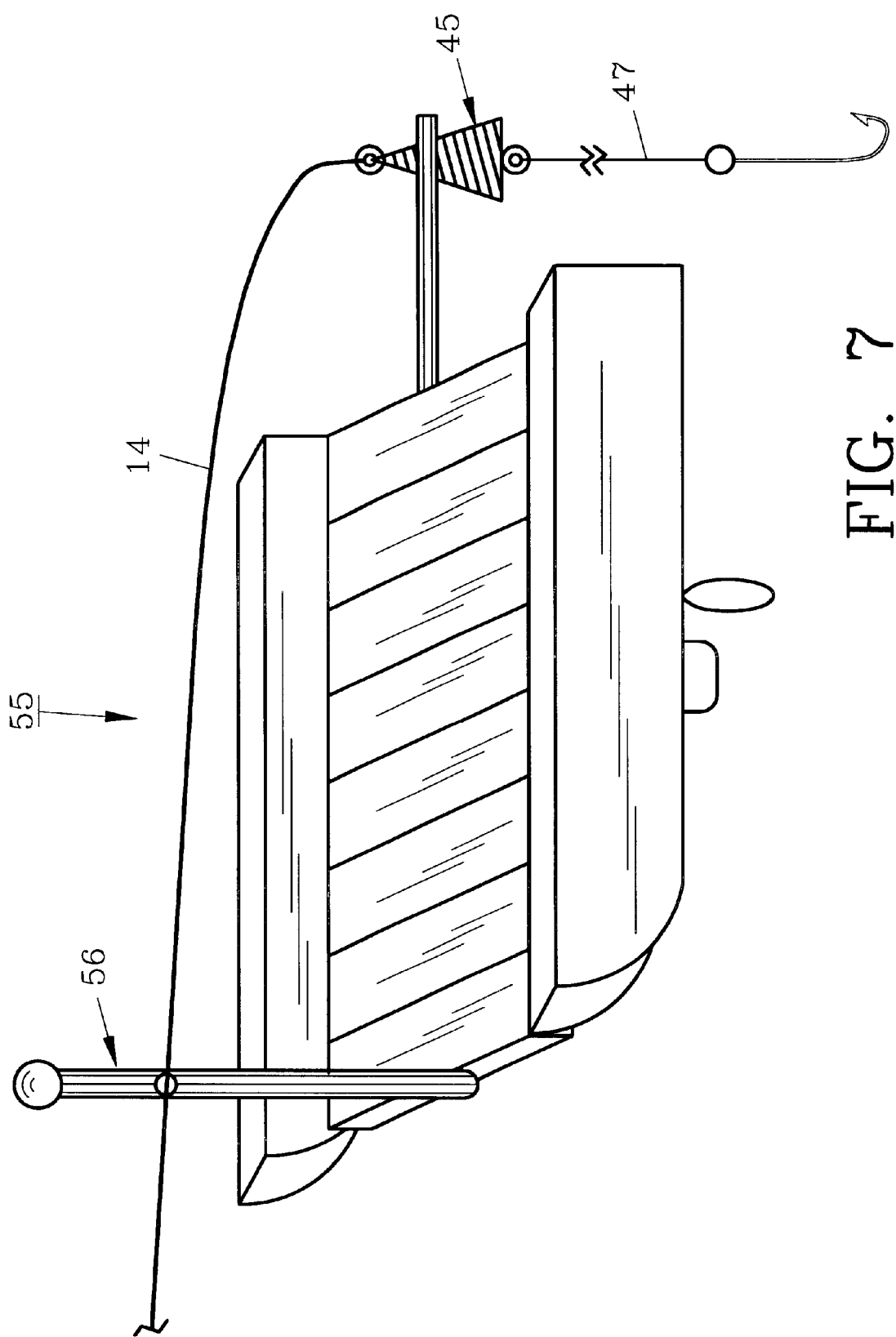
FIG. 7 shows still another embodiment of the fishing boat as can be used with the invention.

As further shown in FIG. 1, a boat such as boat 30 which consists of an outer plastic shell. Boat 30 is also seen enlarged in a somewhat cross-sectional view in FIG. 4. Boat 30 includes antenna 31 for receiving radio signals 25 (FIG. 1) from signal generator 11. Antenna 31 is joined to a standard radio receiver 32 (seen schematically) which is connected to small electric motor 33 for driving propeller shaft 34 through water 40. Line 14 from rod 12 passes through antenna aperture 36 and top boat shell aperture 37. Boat 30 as shown in FIGS. 1, 2 and 4 is the preferred form although other types and boat designs and shapes may be utilized such as shown in FIGS. 5, 6 and 7 which are also stable and will not capsize under usual fishing conditions.

Figure 4:
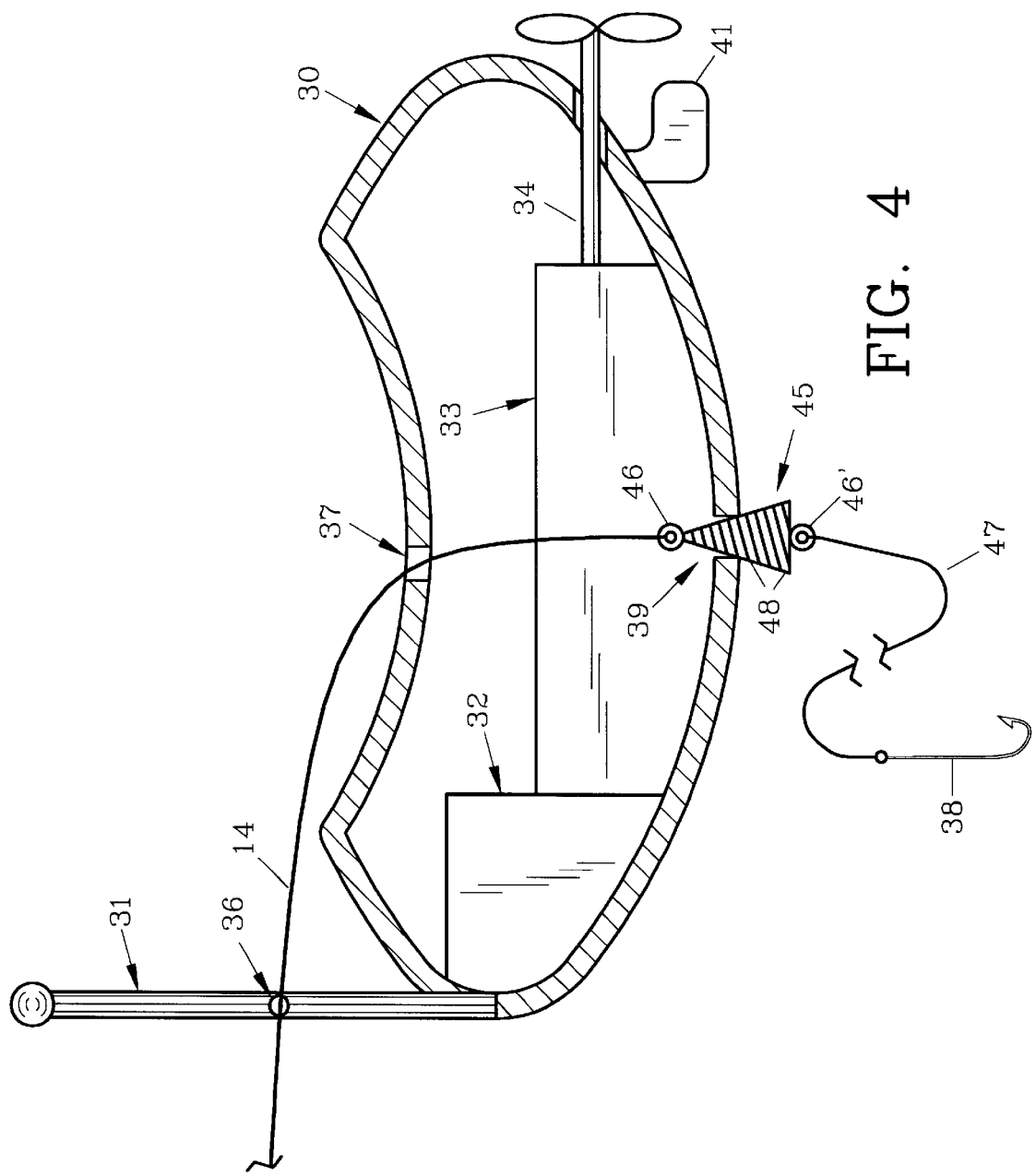
FIG. 4 depicts the fishing boat as shown in FIGS. 1 and 2 in an enlarged cross-sectional view.

In order to maintain bait 35 (FIG. 1) which may be natural or synthetic bait on hook 38 at a desired depth in water 40, slip attachment 45 is provided as illustrated in FIG. 4. Slip attachment 45 includes eyelets 46, 46' at either end thereof for attaching respectively, line 14 and weaker leader 47 thereto. Leader 47 is configured to easily break (relative to line 14) should hook 38 encounter or snag an obstacle and become lodged thereto. Thus, sufficient tugging on line 14 would break leader 47 while leaving line 14 intact with slip attachment 45 remaining affixed.

Preferred slip attachment 45 is shown as conically shaped in FIG. 4 with a plurality of threads 48 therearound. Slip attachment 45 may be molded or otherwise formed from a relatively firm but resilient material such as a synthetic elastomer, rubber or the like to allow it to tightly, frictionally engage a boat aperture such as aperture 39. Thus, in FIG. 4 when fish 60 as shown in FIG. 1 strikes hook 38, slip attachment 45 will easily dislodge from aperture 39. Line 14 is then free to move through apertures 36, 37 and 39 as fish 60 is played. As fish 60 strikes bait 35 as shown in FIG. 1, slip attachment 45 clears aperture 39 and a "feel" of fish 60 is sensed through handle 20. (FIG. 2). As fish 60 is reeled in by rotation of handle 15 of reel 13, boat 30 is simultaneously retrieved. As boat 30 and fish 60 are retrieved simultaneously, after removal of fish 60 from leader 47, hook 38 can be rebaited and boat 30 redirected or guided to a suitable fishing site on water 40 by radio signal generator 11.

Boat 30 is relatively stable in water 40 and will not flip over easily due to its outer configuration. In alternate boat embodiments, boat 50 as shown in FIG. 5, boat 53 as shown in FIG. 6 and boat 55 as seen in FIG. 7 are likewise very stable. Each of boats 50, 53 and 55 are relatively wide and have a front antenna with an aperture such as aperture 36 as shown in FIG. 4 to allow the boat to be reeled in, should the battery contained therein (not shown) be fully discharged, thus preventing electric motor 33 as shown in FIG. 4 from operating. As would be understood, in use, boat 30 is directed under power to a suitable fishing location or on a trolling route using radio signal generator 11 and is then manually reeled back to the operator with reel handle 15 as needed, thus virtually doubling the life of the power supply as no electrical power is required on the return voyage.

The preferred method of utilizing radio-controlled fishing apparatus 10 includes directing a boat, such as boat 30 using signal generator 11 to a desired location or along a trolling route on a lake or pond after attaching a hook and bait, lure or other fish attractant to leader 47 which has been adjusted or selected for a desired depth. Boat 30 as shown in FIG. 1 is steered by directional switch 19 to control rudder 41 while the propeller speed thereof is controlled by trigger switch 18. Once boat 30 arrives at its destination, fish are allowed to strike hook 38 which causes slip attachment 45 to release from aperture 39, thereby freeing line 14. Pulling or tugging sensations are delivered to the operator (not seen) through line 14 and handle 20. Reel handle 15 is manually rotated to reel in line 14 while simultaneously bringing boat 30 and fish 60 to the operator.

Various modifications and improvements can be made to the apparatus and method described and the illustrations and examples provided herein are for explanatory purposes only and are not intended to limit the scope of the appended claims.

I claim:

1. Radio-controlled fishing apparatus comprising: a signal generator, a fishing rod, said signal generator attached to said fishing rod, a line having two ends, one end of said line attached to said rod, a slip attachment, said slip attachment rigidly affixed to the other end of said line, a boat, said boat slidably positioned on said line between said rod and said slip attachment, said boat defining an aperture, and said slip attachment positioned in said aperture whereby said line passes through said aperture as said slip attachment is released from said boat such that said line and said boat can be simultaneously retrieved.

2. The fishing apparatus of claim 1 wherein said fishing rod and said signal generator are integrally formed.

3. The fishing apparatus of claim 1 wherein said slip attachment is conically shaped.

4. The fishing apparatus of claim 3 wherein said slip attachment defines a plurality of threads.

5. The fishing apparatus of claim 4 wherein said slip attachment is formed from a resilient material.

6. The fishing apparatus of claim 1 wherein said boat comprises an antenna, said antenna defining a line aperture for receiving said line.

7. The fishing apparatus of claim 1 further comprising a leader, said leader connected to said slip attachment.

8. The fishing apparatus of claim 1 further comprising an antenna, said antenna joined to said signal generator.

9. Radio-controlled fishing apparatus comprising: a signal generator, a fishing rod, said fishing rod integrally formed with said signal generator, said signal generator comprising a speed control switch and a direction control switch, said fishing rod comprising a reel, a line, said line affixed to said reel, a boat, said boat comprising a signal receiver for receiving signals from said signal generator, a slip attachment, said line connected to said slip attachment, said boat defining a slip attachment aperture, said slip attachment releasably positioned in said slip attachment aperture, a leader, said leader connected to said slip attachment, a hook, said hook affixed to said leader whereby a fish striking said hook will cause said slip attachment to release from said slip attachment aperture so the line remains in said aperture as said line and said boat are simultaneously retrieved.

10. The fishing apparatus of claim 9 further comprising a signal generator antenna, said signal generator antenna connected to fishing rod and to said signal generator.

11. The fishing apparatus of claim 9 further comprising a boat antenna, said boat antenna mounted on said boat, said antenna defining a line aperture, said line positioned through said antenna aperture.

12. A method of fishing in a body of water utilizing a radio-controlled boat and a fishing rod having a signal generator and a reel containing line with a slip attachment affixed at the distal end of the line and the boat slidably positioned on the line between the rod and the slip attachment with the slip attachment positioned in an aperture of said boat, comprising the steps of:

a) directing the boat along the water while the line unreels;

b) allowing a fish to strike the line to pull the slip attachment from the boat aperture;

c) allowing the line to remain in the aperture as the slip attachment is pulled by the fish; and d) reeling in the line and the boat simultaneously.

13. The method of claim 12 wherein directing the boat comprises the step of operating the signal generator to direct the boat.

14. The method of claim 13 wherein allowing a fish to strike comprises the step of tempting the fish with bait affixed to said line.

15. The method of claim 12 wherein reeling in the line comprises the step of manually reeling in the line and the boat simultaneously.

\* \* \* \* \*